United States Patent
Wada (10) Patent No.: US 8,522,575 B2
(45) Date of Patent: Sep. 3, 2013

(54) METHOD FOR PRODUCING MEDICAL GLASS CONTAINER AND BURNER FOR INNER SURFACE TREATMENT OF MEDICAL GLASS CONTAINER

(75) Inventor: Masamichi Wada, Osaka (JP)

(73) Assignee: Nipro Corporation, Osaka (JP)

( * ) Notice: Subject to any disclaimer, the term of this patent is extended or adjusted under 35 U.S.C. 154(b) by 382 days.

(21) Appl. No.: 12/798,488

(22) Filed: Apr. 5, 2010

(65) Prior Publication Data

US 2010/0255229 A1  Oct. 7, 2010

(30) Foreign Application Priority Data

Apr. 7, 2009 (JP) ................................ 2009-093362
May 21, 2009 (JP) ................................ 2009-123522

(51) Int. Cl.
*C03B 29/02* (2006.01)
(52) U.S. Cl.
CPC ..................... *C03B 29/02* (2013.01)
USPC ........................................................ 65/120
(58) Field of Classification Search
CPC ....................................................... C03B 29/02
USPC ...................... 65/23, 31, 269, 120
See application file for complete search history.

(56) References Cited

U.S. PATENT DOCUMENTS

| | | |
|---|---|---|
| 5,445,319 A | 8/1995 | Pan et al. |
| 6,063,329 A | 5/2000 | Tsai |
| 6,345,980 B1 | 2/2002 | Tatarczuk |
| 2009/0099000 A1 | 4/2009 | Kuwabara et al. |

FOREIGN PATENT DOCUMENTS

| | | |
|---|---|---|
| CH | 93 923 | 4/1922 |
| DE | 35 13 820 | 7/1986 |
| DE | 198 12 056 | 10/1999 |
| EP | 1 923 359 | 5/2008 |
| FR | 1 205 320 | 2/1960 |
| GB | 899 679 | 6/1962 |
| JP | 1-169925 | 11/1989 |
| JP | 4-037632 | 2/1992 |
| JP | 6-34112 | 2/1994 |
| JP | 6-76233 | 9/1994 |
| JP | 2002098307 | 4/2002 |
| JP | 3881985 | 11/2006 |
| JP | 4132621 | 6/2008 |
| WO | WO-2006/123621 | 11/2006 |

OTHER PUBLICATIONS

Positive Ion Probe of Methane-Oxygen Combustion J.M. Goodings and D.K. Bohme Department of Chemistry, York University, Downsview, Ontario, M3J IP3, Canada and T.M. Sugden, FRS+ Thornton Research Centre, Shell Research Limited, P.O. Box 1, Chester, CH1 3SH, England p. 891-902; Year 1977.

*Primary Examiner* — Christina Johnson
*Assistant Examiner* — Cynthia Szewczyk
(74) *Attorney, Agent, or Firm* — Jordan and Hamburg LLP (57) ABSTRACT

To provide a measure for reducing the leaching values of alkali components defined in ISO4802 and the like as much as possible in a glass container for use in storage or the like of pharmaceuticals or the like. The measure includes a container converting process of processing a glass tube into a container shape having a bottom and an opening to form a vial and a fire blast process of scanning an inner surface of the vial with a flame of a point burner while emitting the flame to an internal space of the vial and applying the flame to the inner surface.

4 Claims, 5 Drawing Sheets

FIG. 5

METHOD FOR PRODUCING MEDICAL GLASS CONTAINER AND BURNER FOR INNER SURFACE TREATMENT OF MEDICAL GLASS CONTAINER

BACKGROUND OF THE INVENTION

The present invention relates to a medical glass container with little leaching of alkali components or the like from the inner wall surface of the glass and a method for producing the same.

The invention also relates to a burner for use in inner surface treatment of the medical glass container.

Glass containers for use in storage of pharmaceuticals and the like are generally referred to as "Vial". The vial is converted from, for example, a borosilicate glass tube. The glass contains alkali components. The alkali components, such as alkali borate, are known to adhere or condense to the inner wall of the vial during conversion. When such alkali components are leached into pharmaceuticals contained in the vial in the case where the vial is used as a storage container of pharmaceuticals, i.e., for medical use, there is a possibility that the pharmaceuticals deteriorate.

As a method for suppressing the leaching of alkali components, a sulfate treatment method to react the alkali components present on the inner surface of the vial converted from a glass tube with sulfate or the like to produce sodium sulfate ($Na_2SO_4$), and removing the sodium sulfate by washing with water or a chemical vapor deposition method (CVD method) to coat the inner surface of the vial with a silica ($SiO_2$) thin film is known (Japanese Examined Patent Application Publication No. 6-76233).

Medical vials converted from a borosilicate glass tube are requested to meet the leaching standards of alkali components defined in ISO4802-1, ISO4802-2, and the like. In a process of converting a vial from a borosilicate glass tube, the opening of the vial is first formed, and then the bottom is formed. In a process of forming the bottom, the glass tube is heated at a higher temperature, and thus alkali components or the like volatilize from the glass tube and condense to the inner surface of the vial. Thus, a deteriorated region where the alkali components or the like are likely to leach out is formed on the inner surface of the vial. In order to deal with the problem, so-called low temperature working in which the heating temperature of the glass tube in converting the bottom of the vial is adjusted to a lower temperature is carried out.

It is also known that the leaching of the alkali components are reduced by carrying out fire blast of oxygen-gas flame by a point burner to the deteriorated region on the inner surface of a vial converted from the glass tube while rotating the vial (International Publication No. WO2006/123621). The method has advantages in that other compounds are not required to be introduced into the vial and the number of processing for converting a vial with less leaching of alkali components is small.

SUMMARY OF THE INVENTION

However, with an increase in pharmaceuticals sensitive to alkali components, vials with much less leaching of alkali components have been demanded, as compared with the leaching standards defined in ISO4802 and the like.

In the case of using a vertical automatic-forming machine in which a glass tube is held while defining the axial direction thereof as a vertical direction in the forming of a vial, even when the glass tube is heated at a lower temperature, alkali components that volatilize when heated move upward due to a chimney effect in the glass tube. Then, the alkali components accumulatively adhere to the inner surface of the glass tube at the upper portion of the glass tube. Thus, in the vial converted from the upper portion of the glass tube, the alkali components leached from the inner surface thereof exceed the standards defined in ISO4802 and the like in some cases. Therefore, even when low temperature working is employed, there is a possibility that the vial converted from the upper portion of the glass tube cannot meet the standards defined in ISO4802 and the like.

It is preferable to produce vials with less leaching of alkali components or the like, irrespective of the direction, heating temperature, etc., of a glass tube in the converting of the vials, by suppressing the introduction of other compounds, an increase in the number of processes, etc., as much as possible.

Moreover, the glass forming components other than alkali components are possibly leached from the vials serving as a primary packaging of pharmaceuticals. In pharmaceuticals, such as protein preparations, which are expected to increase from now on, the leaching of a slight amount of the components may cause problems.

The present inventors have found that, when a long and narrow metallic nozzle is used for a gas burner so as to centralize a gas flame to the deteriorated region on the inner surface of the vial, the nozzle is remarkably deteriorated by heat and the vial treatment number per nozzle is small.

The present invention has been made in view of the above-described circumstances. It is an object of the invention to provide a measure for decreasing the leaching values of alkali components defined in ISO4802 and the like as much as possible in a glass container for use in storage or the like of pharmaceuticals.

It is another object of the present invention to sharply reduce almost components other than the alkali components leached from the inner surface of the glass container for use in storage or the like of pharmaceuticals.

It is still another object of the invention is to provide a burner for heat treating the inner surface of a medical glass container, and a measure capable of increasing the glass container treatment number per nozzle.

A method for producing a medical glass container according to the invention includes a fire blast process of scanning throughout the inner surface of a glass container with a flame of a burner while emitting the flame of the burner to the internal space of the glass container and applying the flame to the inner surface of the glass container.

The medical glass container refers to glass containers in which liquid pharmaceuticals are stored and held and from which the pharmaceuticals can be taken out from the opening for use. Examples include glass containers generally referred to as vials or ampules.

In the fire blast process, when the flame of the burner is directly applied to the inner surface of the glass container, residues, such as alkali components or the like condensing and adhering to the inner surface of the glass container or alkali components produced when the glass tube is converted, are blown away to be discharged to the outside of the glass container.

In the fire blast process, the flame may be applied to the inner surface while rotating the glass container around the axis.

Thus, the flame can be uniformly applied to the inner surface of the glass container. The inner surface of the glass is not continuously heated partially with the flame, and thus deformation of the glass container is prevented.

In the fire blast process, it is preferable that the distance from the inner surface of the glass container to the top end of a nozzle of the burner be uniformly held.

Thus, the flame can be uniformly applied throughout the inner surface of the glass container.

In the fire blast process, it is preferable that a plasma rich portion of the flame to be emitted from the burner be applied to the inner surface of the glass container.

It is preferable to use a burner having a ceramic nozzle as the burner.

Examples of the ceramic nozzle include nozzles formed of heat-resistant ceramics, such as alumina, zirconia, or magnesia.

The method for producing a medical glass container according to the invention may also further include a container converting process of processing a glass tube into a container shape having the bottom and the opening to form the glass container.

In the container converting process, the glass tube as a raw material is processed into a glass container having a container shape having the bottom and the opening. In this processing, the glass tube is heated to be transformed into a shape having the bottom and the opening. When the glass tube is heated, the alkali components or the like of glass volatilize, and the volatilized alkali components condense and adhere to the inner surface of the glass container in a process of cooling the glass container. The areas to which the alkali components or the like condense and adhere vary depending on whether the processing is carried out while directing the axis of the glass tube in a horizontal direction or the processing is carried out while directing the axis of the glass tube in a vertical direction. Moreover, when the glass tube is converted, it is assumed that the alkali component or the like remain on the inner surface of the glass tube.

The present invention may be construed as a medical glass container produced by the method for producing a medical glass container.

It is preferable that the amount of sodium to be leached from the inner surface of the medical glass container meet the standards defined in ISO4802.

It is particularly preferable that the amount of sodium to be leached from the inner surface of the medical glass container be 1/10 or lower relative to the standards defined in ISO4802.

It is preferable that the amount of silicon to be leached from the inner surface of the medical glass container be 0.1 ppm or lower.

It is preferable that the amount of boron to be leached from the inner surface of the medical glass container be 0.05 ppm or lower.

A burner for inner surface treatment of a medical glass container according to the invention has a burner body having a first flow path through which a fuel is circulated and a second flow path connecting to the first flow path of the burner body, in which the burner has a long and narrow nozzle that can be inserted into the internal space of a medical glass container or an intermediate product thereof as a processing target. The nozzle is formed of ceramic.

A fuel is circulated through the first flow path of the burner body. The fuel is a mixture of gas and oxygen, for example. The fuel is circulated from the first flow path to the second flow path, and is burnt at the top end of the nozzle to form a flame.

The nozzle has a long and narrow shape that can be inserted into the internal space of the medical glass container or the intermediate product thereof. For example, when the medical glass container is converted from a glass tube, the intermediate product of the medical glass container refers to a product having the bottom formed at least one end of the glass tube. Vials or ampules are mentioned as a typical example thereof.

In general, the medical glass container has a cylindrical shape having the opening at one portion from which pharmaceuticals are charged or taken out and having the bottom formed at the side opposite to the opening. When the bottom is formed at one end of the glass tube, even the intermediate product of the medical glass container forms a cylindrical shape in which only the other end at which the opening is formed opens. The nozzle is inserted into the internal space of the medical glass container from the opening. The flame emitted from the top end of the nozzle is intensively applied to the inner surface of the medical glass container. The flame hits the inner surface of the medical glass container by the flow of the flame, and then emitted to the outside from the opening. Thus, the nozzle inserted into the internal space of the medical glass container is enveloped in the flame. However, since the nozzle is formed of ceramic, deterioration of the nozzle due to the heat of the flame is suppressed. Examples of the ceramic include alumina, magnesia, and zirconia. The nozzle is not required to be entirely formed of ceramic. At least a portion to be inserted into the internal space of the medical glass container or the intermediate product thereof may be formed of ceramic.

It is preferable that the nozzle be a nozzle that can be inserted into the internal space of the medical glass container in which a second diameter of the opening is smaller than a first diameter of the internal space.

The present invention may be construed as a medical glass container whose inner surface is heated using the burner for inner surface treatment of a medical glass container.

The present invention may be construed as a method for producing a medical glass container including removing a deteriorated region by inserting a burner having a ceramic nozzle into the internal space of a medical glass container or an intermediate product thereof, and emitting a flame formed by a fuel emitted from the nozzle to the medical glass container or the intermediate product thereof.

ADVANTAGES OF THE INVENTION

According to the invention, alkali components or the like to be leached from the inner surface of a glass container are sharply reduced by scanning throughout the inner surface of the glass with a flame of a burner while emitting the flame to the internal space of the glass container, and applying the flame to the inner surface.

According to the invention, a long and narrow nozzle that can be inserted into the internal space of a medical glass container or an intermediate product thereof has been made of ceramic. Thus, even when the nozzle inserted into the internal space for heat-treating the inner surface of the medical glass container or the intermediate product thereof is exposed to the flame, deterioration of the nozzle due to heat of the flame is suppressed. Thus, the medical glass container treatment number per nozzle increases, thereby mass-producing medical glass containers with reduced leacing of alkali components at a low cost.

PREFERRED EMBODIMENTS

Hereinafter, preferable embodiments of the invention will be described. It is a matter of course that this embodiment is simply one embodiment of the invention, and can be modified insofar as the gist of the invention is not altered.

Figure 1:
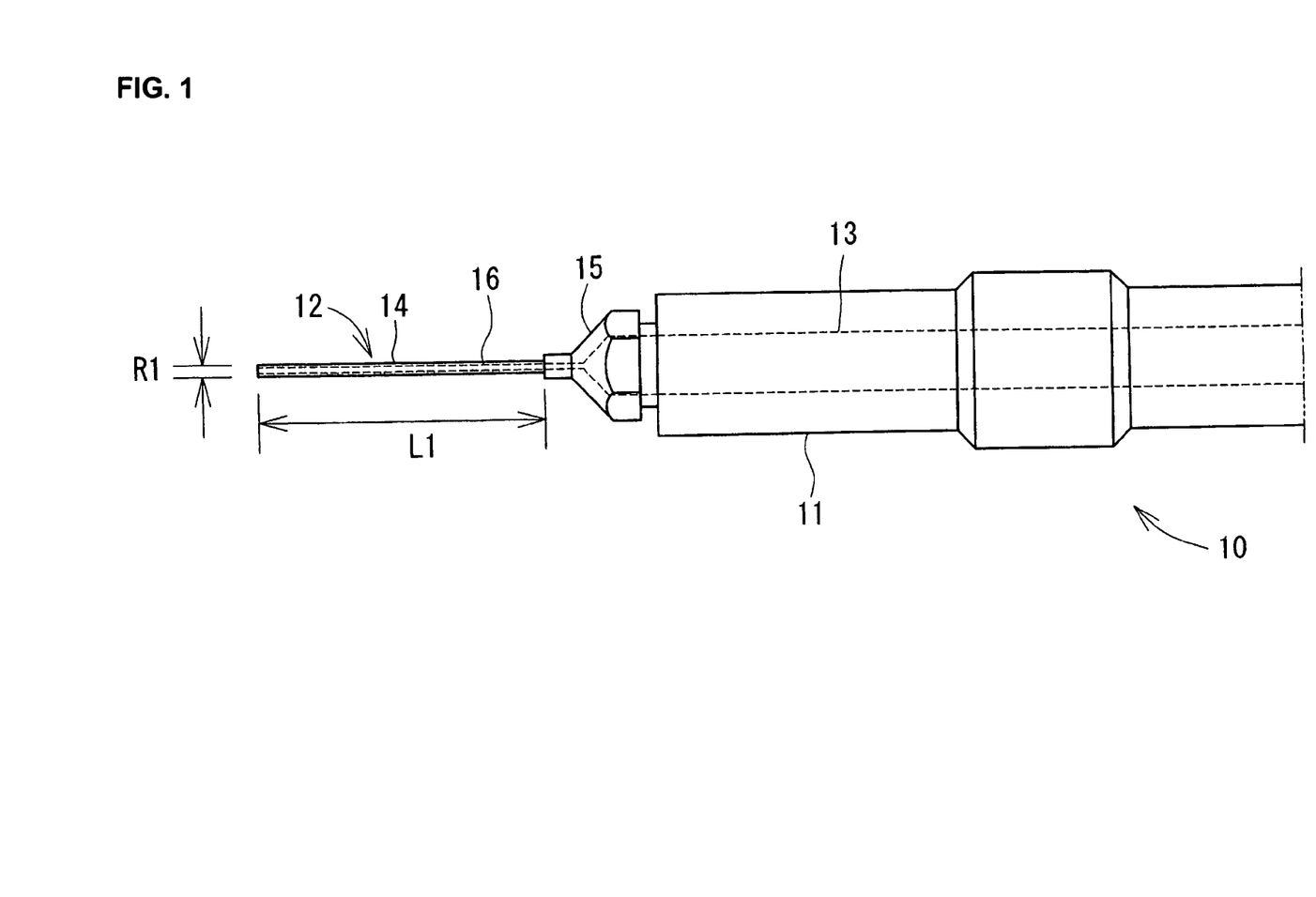
FIG. 1 is a partial cross sectional view illustrating the structure of a point burner 10 according to an embodiment of the invention.

A point burner 10 illustrated in FIG. 1 is used in a method for producing a medical glass container according to the invention. The point burner 10 is used in a fire blast process of the invention so as to treat an inner surface 54 of a vial 50.

The point burner 10 is mainly separated roughly into a burner body 11 and a nozzle 12. The burner body 11 has a tubular shape having a first flow path 13 through which a mixed gas is circulated. The mixed gas is a mixture of gas and oxygen, and the mixed gas generated by a known technique is circulated at a given flow rate into the first flow path 13 of the burner body 11. The mixed gas is equivalent to a fuel in the invention.

The nozzle 12 is provided at the top end of the burner body 11. The nozzle 12 is roughly separated into a nozzle portion 14 and a connecting portion 15. The connecting portion 15 is a conical-shaped member having a female screw formed on the inner surface. Although not illustrated in FIG. 1 in detail, the female screw disposed on the connecting portion 15 is screwed into a male screw disposed at the top end of the burner body 11, so that the nozzle 12 is connected to the top end of the burner body 11. Thus, the nozzle 12 is exchangeably attached to the burner body 11.

The nozzle portion 14 is disposed at the top of the connecting portion 15. The nozzle portion 14 has a straw-like long and narrow member and is disposed extending from the top of the connecting portion 15 in the axial direction of the burner body 11. The nozzle portion 14 is made of ceramic. The outer diameter R1 and the length L1 in the axial direction of the nozzle portion 14 are determined considering the inner diameter R2 of an opening 51 of the vial 50 as a processing target, the depth L2 of the vial 50, or the like. The outer diameter R1 of the nozzle portion 14 is determined so that the top end thereof can be inserted into at least an internal space 52 from the opening 51 of the vial 50. Specifically, the outer diameter R1 of the nozzle portion 14 is enough smaller than the inner diameter R2 of the opening 51. The length L1 in the axial direction of the nozzle portion 14 is determined so that a flame 20 emitted from the top end of the nozzle portion 14 can reach near a bottom 53 of the vial 50. Specifically, the length L1 of the nozzle portion 14 is longer than the depth L2 of the vial 50.

A second flow path 16 as the internal space of the nozzle portion 14 is connected to the first flow path 13 of the burner body 11 through the internal space of the connecting portion 15. Thus, the mixed gas to be circulated into the first flow path 13 at a given flow rate is emitted from the top end of the nozzle portion 14 through the second flow path 16. The mixed gas burns to form the flame 20.

The vial 50 is provided with an opening 51 and a bottom 53 by processing a glass tube 60. The inner diameter R3 of the internal space 52 of the vial 50 is larger than the inner diameter R2 of the opening 51. More specifically, the vial 50 is a so-called narrow-mouthed glass container. The vial 50 is an example of the glass container in the invention. The inner diameter R3 is equivalent to the first diameter in the invention. The inner diameter R2 is equivalent to the second diameter in the invention.

Hereinafter, a method for producing the vial 50 will be described. The production method is mainly separated roughly into the following two processes:

(1) Container converting process of processing a glass tube 60 into the vial 50 having the opening 51 and the bottom 53, and (2) Fire blast process of scanning the inner surface 54 by the nozzle 12 of the point burner 10 while emitting the flame 20 of the point burner 10 to the internal space 52 of the vial 50 and applying the flame 20 to the inner surface 54.

Figure 2:
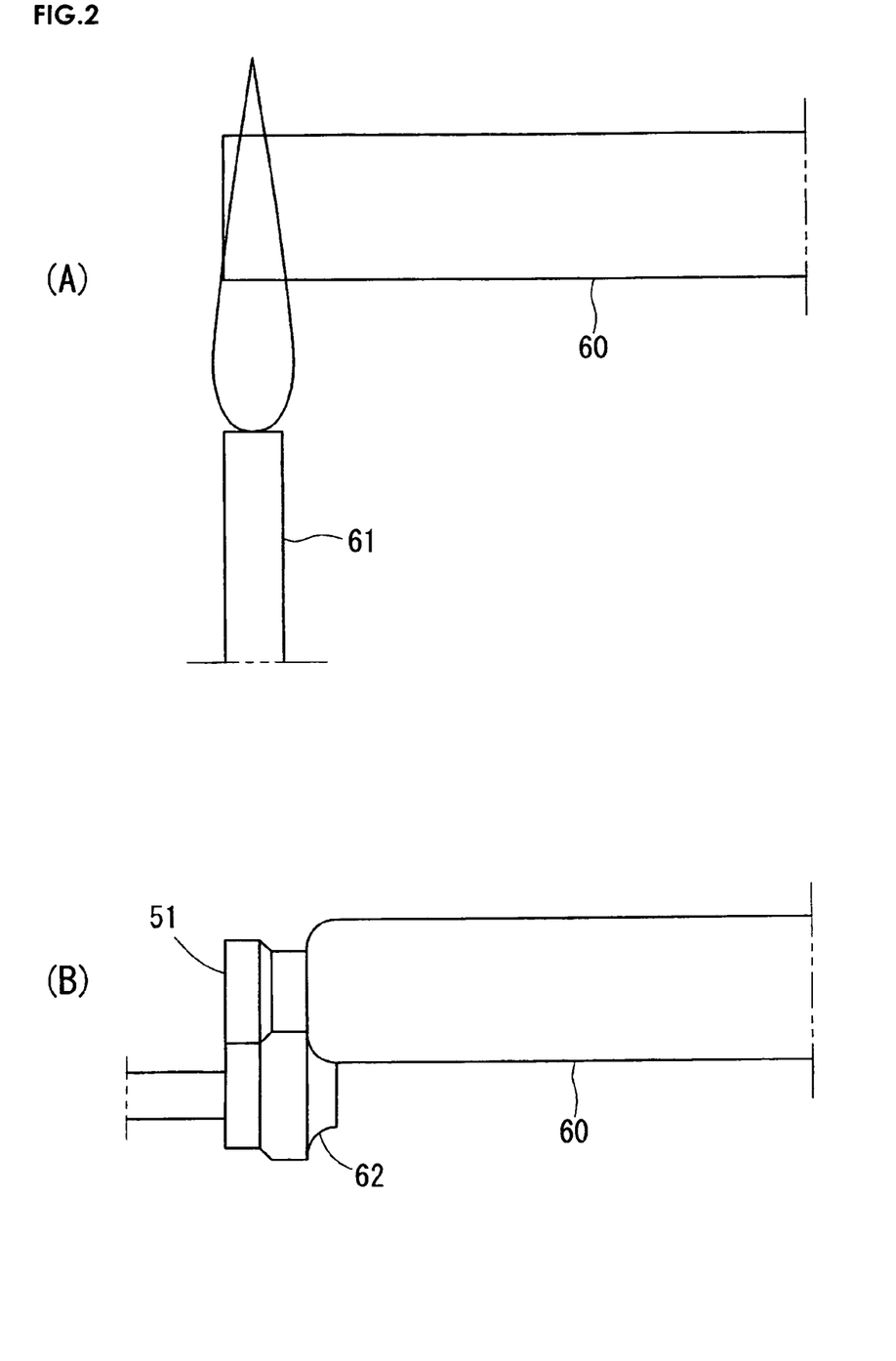
FIG. 2 is a view for describing a container converting process.

As illustrated in FIG. 2(A), the glass tube 60 is fixed so that the axial direction becomes a horizontal direction (horizontal direction in FIG. 2), and a flame of a burner 61 is applied to one end thereof to pre-heat the glass tube 60. Then, the opening 51 is formed by applying a converting jig 62 to one end of the pre-heated one end as illustrated in FIG. 2(B). Specifically, the one end of the glass tube 60 is narrowed down so that the outer diameter of the glass tube 60 is reduced by the converting jig 62.

Figure 3:
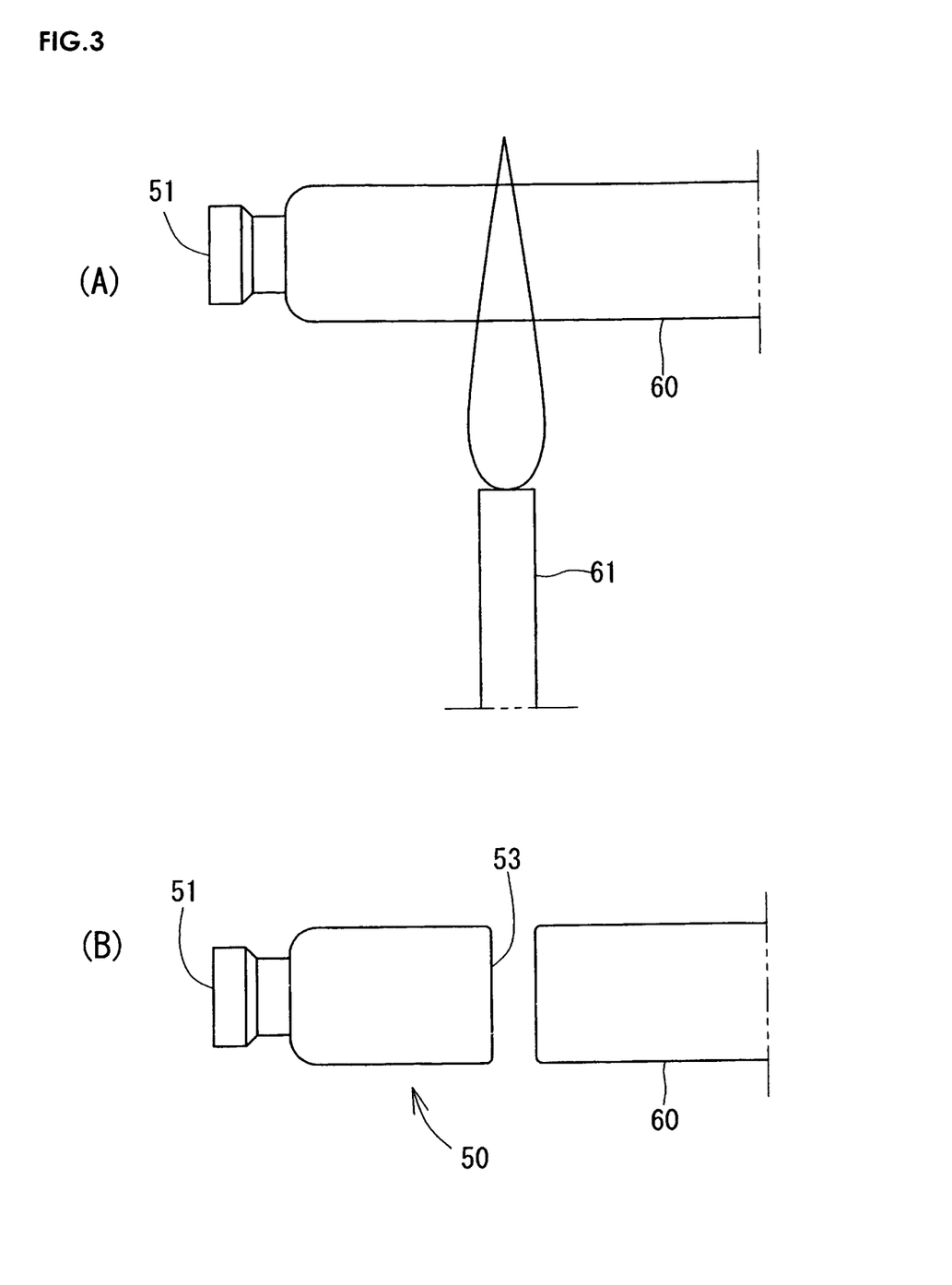
FIG. 3 is a view for describing a container converting process.

As illustrated in FIG. 3(A), the glass tube 60 is moved in the horizontal direction (horizontal direction in FIG. 3) relative to the burner 60, so that the flame of the burner 61 is applied to the glass tube 60. The one end of the glass tube 60 on which the opening 51 has been formed is burnt off by the flame of the burner 61 and, simultaneously, the bottom 53 is formed at the burnt-off portion. Thus, as illustrated in FIG. 3(B), one vial 50 having the opening 51 and the bottom 53 is formed. The container converting process may be carried out by a so-called vertical automatic-converting machine for forming the opening 51 and the bottom 53 at the lower end by fixing the glass tube 60 so that the axial direction becomes a vertical direction.

Subsequently, a fire blast process using the point burner 10 is carried out to the obtained vial 50. In this description, a process described later is referred to as "Fire blast process". Here, the fire blast process is a process for removing a deteriorated region produced on the inner surface 54 by intensively emitting the flame 20 formed by the mixed gas that is circulated at a relatively high flow rate to the inner surface 54 of the vial 50. The fire blast process is equivalent to the heat-treatment in the invention.

Figure 4:
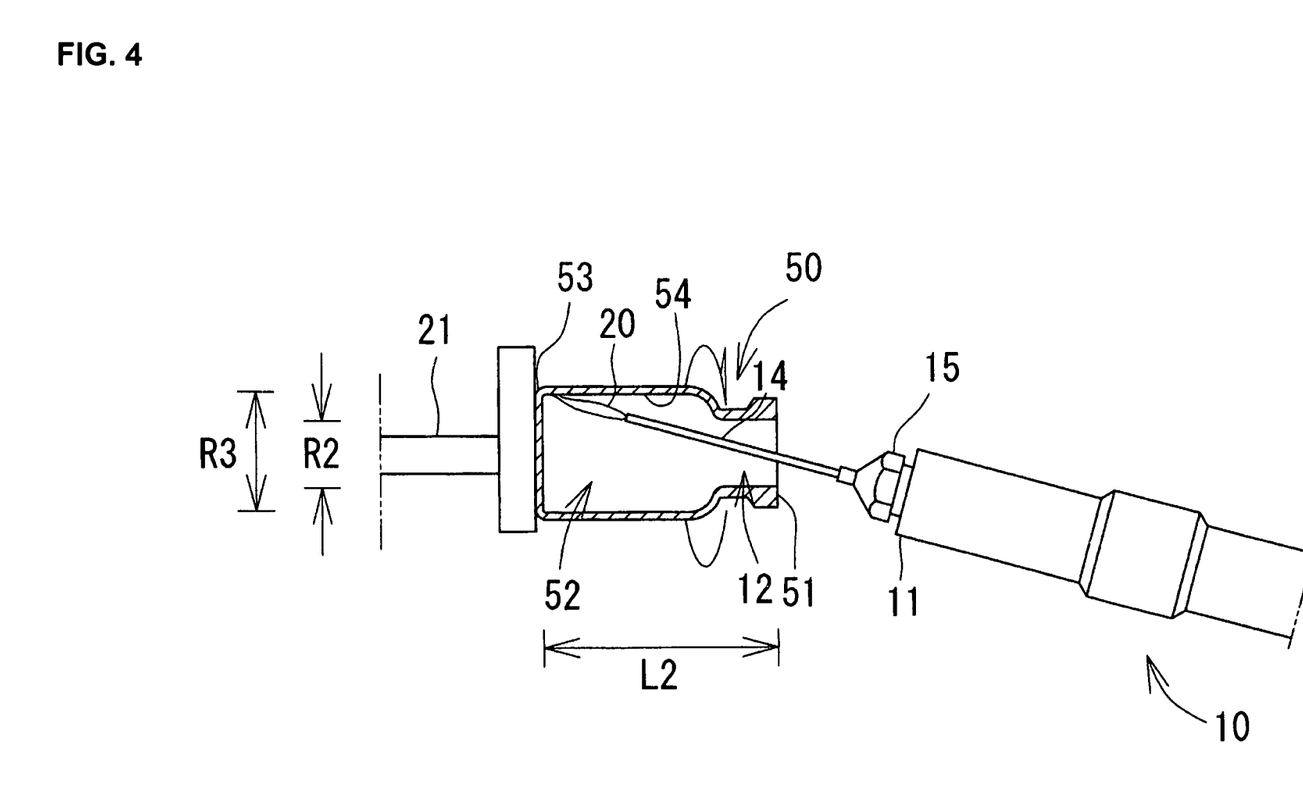
FIG. 4 is a view for describing a fire blast process.

As illustrated in FIG. 4, the top end of the nozzle portion 14 of the point burner 10 is inserted into the internal space 52 from the opening 51 of the vial 50. Then, the position of the point burner 10 is fixed relative to the vial 50 so that the flame 20 emitted from the top end of the nozzle portion 14 hits the inner surface 54 near the bottom 53. The point burner 10 can be inserted into the vial 50 through the opening 51. And the point burner 10 can be moved out from the opening 51.

Specifically, as illustrated in FIG. 4, the vial 50 is fixed to a support member 21 while the opening 51 and the bottom 53 face each other in the horizontal direction (horizontal direction in FIG. 4), i.e., a so-called transverse position. The support member 21 supports the transverse vial 50 while defining the horizontal direction as the axial direction. The nozzle portion 14 of the point burner 10 is inserted into the opening 51 that is supported by the support member 21 and opens in the horizontal direction from the lower portion of the vial 50. The axis of the nozzle portion 14 extends upwardly relative to the inner surface 54 near the bottom 53 of the vial 50. More specifically, the flame 20 emitted from the nozzle portion 14 hits the upper portion of the inner surface 54 near the bottom 53 of the vial 50.

A plasma rich portion is present in the flame 20 to be emitted from the point burner 10. With respect to the point burner 10, the distance from the top end of the nozzle 12 to the inner surface 54 is adjusted so that the plasma rich portion in the flame 20 hits the inner surface 54 near the bottom 53 of the vial 50.

As described above, the vial 50 supported by the support member 21 is rotated by a rotating machine (not illustrated) while the plasma rich portion of the flame 20 is applied to the inner surface 54 of the vial 50, so that the plasma rich portion of flame 20 is uniformly applied to the inner surface 54 near the bottom 53. The alkali components or the like adhering to or remaining on the inner surface 54 near the bottom 53 are removed by the plasma rich portion of the flame 20.

Figure 5:
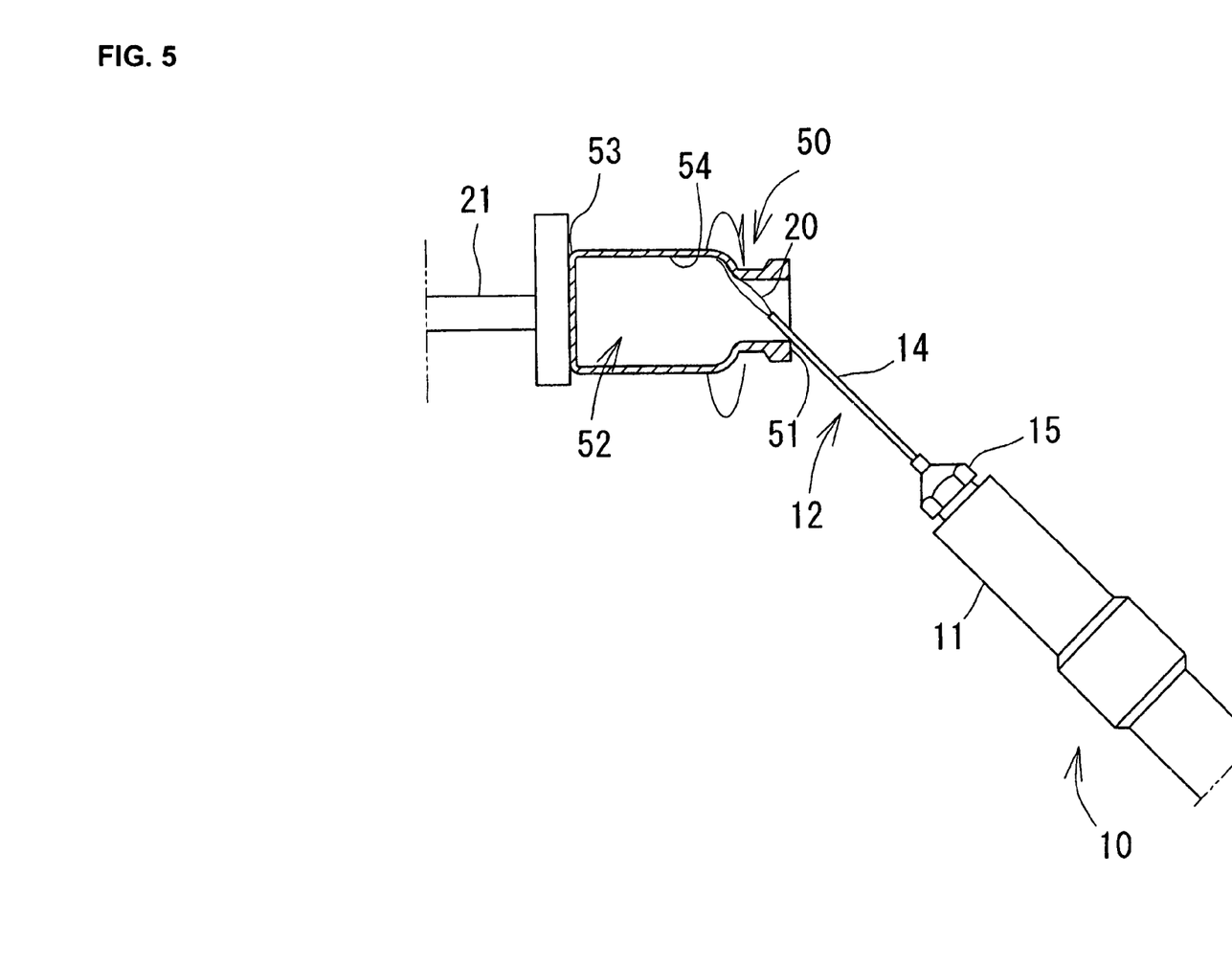
FIG. 5 is a view for describing a fire blast process.

The point burner 10 is moved relative to the vial 50 while changing the state to the state illustrated in FIG. 5 from the state illustrated in FIG. 4. Specifically, the point burner 10 is moved relative to the vial 50 so that the plasma rich portion in the flame 20 scans, in the axial direction of the vial 50, a portion from the inner surface 54 near the bottom 53 of the vial 50 to the inner surface 54 near the opening 51. During the scanning, the distance from the top end of the nozzle 12 to the inner surface 54 along the axial direction of the nozzle 12 is uniformly held.

As described above, by moving the point burner 10 relative to the vial 50 in a state where the plasma rich portion of the flame 20 is applied to the inner surface 54 of the vial 50, the plasma rich portion of the flame 20 scans a portion from the inner surface 54 near the bottom 53 to the inner surface 54 near the opening 51. During the scanning, the vial 50 supported by the support member 21 is rotated by a rotating machine (not shown). Thus, the alkali components or the like adhering to or remaining on the inner surface 54 of the vial 50 are uniformly removed. Thus, the leaching of the alkali components or the like from the inner surface 54 of the vial 50 is suppressed.

There is no limitation on the direction in which the point burner 10 is moved relative to the vial 50. For example, the direction may be a direction from the inner surface 54 near the bottom 53 to the inner surface 54 near the opening 51 or an opposite direction thereto or a direction from the vicinity of the center of the bottom 53 and the opening 51 to the opening 51 or the bottom 53, respectively.

According to this embodiment, by scanning throughout the inner surface 54 of the vial 50 with the flame 20 while emitting the flame 20 of the point burner 10 to the internal space 52 of the vial 50, and applying the plasma rich portion of the flame 20 to the inner surface 54, the alkali components or the like leached from the inner surface 54 of the vial 50 are sharply reduced.

In the point burner 10 described above, the nozzle portion 14 that can be inserted into the internal space 52 of the vial 50 is made of ceramic. Therefore, even when the inner surface 54 of the vial 50 is fire blasted so that the nozzle portion 14 is exposed to the flame 20, deterioration of the nozzle portion 14 due to heat of the flame 20 is suppressed. Thus, the treatment number of the vial 50 per nozzle 12 increases, and thus the vial 50 in which the leaching of the alkali components is suppressed is mass-produced at a low cost.

Moreover, the point burner 10 according to this embodiment is particularly useful for the case where the long and narrow nozzle portion 14 is inserted into the internal space 52 of the vial 50 whose inner diameter R2 of the opening 51 is smaller than the inner diameter R3 of the internal space 52 and fire blasted, and thus the nozzle portion 14 is always exposed to the flame 20 discharged to the outside of the vial 50 from the opening 51.

In the embodiment described above, the method for producing the vial 50 including the container converting process and the fire blast process is described. However, in the method for producing a medical glass container according to the invention, the container converting process is not essential. More specifically, the fire blast process may be carried out to a glass container produced by a known process other than the container converting process described above.

This embodiment describes an aspect in which the vial 50 is converted from a glass tube, and then the point burner 10 is used for carrying out fire blast. However, the process of forming the opening 51 and the bottom 53 on a glass tube to form the vial 50 may also be carried out by the point burner 10.

Moreover, this embodiment describes an aspect in which the point burner 10 is used for the vial 50 for carrying out the fire blast. However, the point burner 10 may be used to an intermediate product of the vial 50 for carrying out fire blast. For example, even in an aspect in which an intermediate product in which the bottom 53 is formed at one end of a glass tube as a raw material of the vial 50 and the opening 51 is not yet formed at the other end thereof may be fire blasted by inserting the nozzle 12 of the point burner 10 into the internal space 52 from the opening at the other end, the same working effects as described above are demonstrated.

Hereinafter, Examples of the invention will be described.

By the container converting process in the embodiment described above, a 2 mL vial having on outer diameter of 15 mm, a total length of 33 mm, and a diameter in the opening of 7.0 mm was produced. A temperature for heating a glass tube when producing the vial was adjusted to a relatively low temperature or high temperature. In this Example, a process in which the heating temperature of a glass tube is a low temperature is referred to as low temperature working and a process in which the heating temperature of a glass tube is a high temperature is referred to as high temperature working. The processing of the glass tube was carried using a so-called vertical automatic-converting machine.

Examples 1 and 2

Each of the vials produced by the low temperature working and the high temperature working was subjected to the fire blast process in the embodiment described above. As a nozzle portion of a point burner, an alumina nozzle having an inner diameter of 1.0 mm was used. To the inner surface of the vial subjected to the low temperature working, the fire blast process for 45 seconds was carried out and to the inner surface of the vial subjected to the high temperature working, the fire blast process for 55 seconds was carried out. The vial subjected to the low temperature working to which the fire blast process for 45 seconds was carried out was defined as Example 1 and the vial subjected to the high temperature working to which the fire blast process for 55 seconds was carried out was defined as Example 2.

Comparative Examples 1 and 2

To each of the vials obtained by the low temperature working and the high temperature working, the vial subjected to the low temperature working and not subjected to the fire blast process was defined as Comparative Example 1 and the vial subjected to the high temperature working and not subjected to the fire blast process was defined as Comparative Example 2.

Leaching Amount of Alkali Components

The leaching amount of alkali components was measured for each of the vials of Examples 1 and 2 and Comparative Examples 1 and 2 described above. The measurement was carried out by charging each vial with 2 mL of distilled water and heating the same at 121° C. for 60 minutes. After cooling, the sodium contained in the distilled water charged in each vial was measured. The measurement of sodium was carried out by the atomic absorption method defined in ISO4802-2. The sodium amounts (μg/mL) obtained in each vial of Examples 1 and 2 and Comparative Examples 1 and 2 are shown in Table 1.

TABLE 1

Leaching amount of sodium

| | N | Na amount (μg/ml) | Average value |
|---|---|---|---|
| Example 1 | 1 | 0.39 | 0.36 |
| | 2 | 0.25 | |
| | 3 | 0.47 | |
| Example 2 | 1 | 0.45 | 0.39 |
| | 2 | 0.35 | |
| | 3 | 0.37 | |
| Comparative Example 1 | 1 | 1.47 | 1.63 |
| | 2 | 1.65 | |
| | 3 | 1.84 | |
| Comparative Example 2 | 1 | 8.20 | 8.10 |
| | 2 | 7.81 | |
| | 3 | 8.30 | |

As shown in Table 1, the leaching of sodium of 0.36 μg/mL was confirmed in the vial of Example 1 and the leaching of sodium of 0.39 μg/mL was confirmed in the vial of Example 2. The leaching amounts of sodium were lower than about 1/10 of the maximum value of 4.5 μg/mL specified in ISO4802-2, and far below the maximum value. In contrast, the leaching of sodium of 1.63 μg/mL was confirmed in the vial of Comparative Example 1 and the leaching of sodium of 8.10 μg/mL was confirmed in the vial of Comparative Example 2. The leaching amount of sodium from the vial of Comparative Example 1 was lower than the maximum value of 4.5 μg/mL specified in ISO4802-2 but was 4 or more times that of the vial of Example 1. The leaching amount of sodium from the vial of Comparative Example 2 further exceeded the maximum value of 4.5 μg/mL specified in ISO4802-2.

Leaching Amount of Other Components Except than Alkali

The leaching amount of other components except alkali was measured for each of the vials of Examples 1 and 2 and Comparative Examples 1 and 2 described above. The measurement was carried out by charging each vial with 2 mL of distilled water for injection, and heating each vial at 121° C. for 60 minutes. After cooling, other components (Si, Al, B, Ca, Ba) contained in the distilled water charged in each vial were measured. The measurement of other components was carried out by ICP (inductively coupled plasma) spectrometry. The amounts (ppm) of other components obtained in each vial of Examples 1 and 2 and Comparative Examples 1 and 2 are shown in Table 2.

TABLE 2

Leaching amount of other components

| | Components | Leaching amount (ppm) |
|---|---|---|
| Example 1 | Si | 0.03 |
| | Al | 0.00 |
| | B | 0.00 |
| | Ca | 0.00 |
| | Ba | 0.00 |
| Example 2 | Si | 0.06 |
| | Al | 0.01 |
| | B | 0.01 |
| | Ca | 0.00 |
| | Ba | 0.00 |
| Comparative Example 1 | Si | 1.34 |
| | Al | 0.01 |
| | B | 0.79 |
| | Ca | 0.00 |
| | Ba | 0.01 |
| Comparative Example 2 | Si | 23.30 |
| | Al | 2.39 |
| | B | 6.99 |
| | Ca | 0.50 |
| | Ba | 0.86 |

As shown in Table 2, the leaching of Si of 0.03 ppm was confirmed in the vial of Example 1 and the leaching amounts of Al, B, Ca, and Ba were all 0.00 ppm. In the vial of Example 2, the leaching of 0.06 ppm of Si, 0.01 ppm of Al, and 0.01 ppm of B were confirmed, and the leaching amounts of Ca and Ba were all 0.00 ppm.

In contrast, in the vial of Comparative Example 1, the leaching of each of 1.34 ppm of Si, 0.01 ppm of Al, 0.79 ppm of B, and 0.01 ppm of Ba was confirmed, the leaching amount of Ca was 0.00 ppm. In the vial of Comparative Example 2, the leaching of each of 23.3 ppm of Si, 2.39 ppm of Al, 6.99 ppm of B, 0.50 ppm of Ca, and 0.86 ppm of Ba was confirmed.

Thus, in each vial of Examples 1 and 2, other components of Si, Al, B, Ca, and Ba were detected slightly or not at all. In contrast, in each vial of Comparative Examples 1 and 2, other components were all detected, except Ca in Comparative Example 1, and in particular the evaluation values of Si, Al, and B were remarkably different from those of Examples 1 and 2.

The invention claimed is:

1. A method for producing a medical glass container having a mouth opening inner diameter that is less than an internal space diameter, comprising:
   processing a glass tube into the glass container having the mouth opening and a bottom;
   angling a point burner relative to an axis of the glass container;
   positioning a distal end of a nozzle of the point burner at a fixed distance from an inner sidewall surface of the glass container so as to emit a plasma rich portion of a flame from the nozzle onto the inner sidewall surface of the glass container at a bottom of the glass container; and
   scanning the flame alone the inner sidewall surface, said scanning comprising moving the point burner axially relative to the glass container inner sidewall while rotating glass container about said axis, wherein the nozzle maintains said fixed distance from a nearest portion of the inner sidewall during said point burner moving and glass container rotating.

2. The method for producing a medical glass container according to claim 1, wherein throughout said inner sidewall scanning, the plasma rich portion of the flame hits the inner sidewall surface.

3. The method for producing a medical glass container according to claim 1, wherein a burner having a ceramic nozzle is used as the burner.

4. The method for producing a medical glass container according to claim 1, further comprising a container converting process of processing a glass tube into a container shape having a bottom and an opening to form the glass container.

* * * * *

UNITED STATES PATENT AND TRADEMARK OFFICE
CERTIFICATE OF CORRECTION

| | |
|---|---|
| PATENT NO. | : 8,522,575 B2 |
| APPLICATION NO. | : 12/798488 |
| DATED | : September 3, 2013 |
| INVENTOR(S) | : Masamichi Wada |

It is certified that error appears in the above-identified patent and that said Letters Patent is hereby corrected as shown below:

In the Specification

Col. 10, line 48, change "the flame alone the inner sidewall" to -- the flame along the inner sidewall --.

Signed and Sealed this
Twenty-seventh Day of May, 2014

Michelle K. Lee
*Deputy Director of the United States Patent and Trademark Office*